US012794121B2

(12) United States Patent
Lin et al.

(10) Patent No.: US 12,794,121 B2
(45) Date of Patent: Nov. 10, 2026

(54) ANTENNA STRUCTURE

(71) Applicant: MEDIATEK INC., Hsinchu City (TW)

(72) Inventors: Yen-Ju Lin, Hsinchu City (TW); Chung-Hsin Chiang, Hsinchu City (TW); Wun-Jian Lin, Hsinchu City (TW); Shih-Huang Yeh, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 214 days.

(21) Appl. No.: 18/457,543

(22) Filed: Aug. 29, 2023

(65) Prior Publication Data

US 2024/0088561 A1 Mar. 14, 2024

Related U.S. Application Data

(60) Provisional application No. 63/374,922, filed on Sep. 8, 2022.

(51) Int. Cl.

| | |
|---|---|
| ***H01Q 5/307*** | (2015.01) |
| ***H01Q 1/38*** | (2006.01) |
| ***H01Q 1/48*** | (2006.01) |
| ***H01Q 5/378*** | (2015.01) |
| ***H01Q 9/04*** | (2006.01) |

(52) U.S. Cl.

CPC ............... *H01Q 5/307* (2015.01); *H01Q 1/38* (2013.01); *H01Q 1/48* (2013.01); *H01Q 5/378* (2015.01); *H01Q 9/0414* (2013.01)

(58) Field of Classification Search

CPC ............ H01Q 5/307; H01Q 1/38; H01Q 1/48; H01Q 5/378; H01Q 9/0414; H01Q 5/385; H01Q 5/40

See application file for complete search history.

(56) References Cited

U.S. PATENT DOCUMENTS

| | | | | |
|---|---|---|---|---|
| 2003/0146872 | A1* | 8/2003 | Kellerman | H01Q 9/0414 343/700 MS |
| 2018/0358701 | A1* | 12/2018 | Gimersky | H01Q 9/0414 |
| 2019/0165449 | A1* | 5/2019 | Kim | H01Q 21/065 |
| 2019/0319364 | A1* | 10/2019 | Yang | H01Q 5/364 |
| 2021/0265745 | A1* | 8/2021 | Edwards | H01Q 1/243 |
| 2021/0367358 | A1* | 11/2021 | He | H01Q 25/001 |
| 2022/0255229 | A1* | 8/2022 | Jia | H01Q 5/385 |

* cited by examiner

*Primary Examiner* — Alexander H Taningco
*Assistant Examiner* — Anna N Hamadyk
(74) *Attorney, Agent, or Firm* — McClure, Qualey & Rodack, LLP

(57) ABSTRACT

An antenna structure is provided. The antenna structure includes a first metal layer and a second metal layer disposed over the first metal layer. The second metal layer forms a first antenna resonating element operating at a first band and has a first opening. The antenna structure also includes a third metal layer disposed over the second metal layer. The third metal layer forms a second antenna resonating element operating at a second band, which is different from the first band. The antenna structure further includes a first transmission line extending from the first metal layer to the second metal layer and a second transmission line extending from the first metal layer through the first opening to the third metal layer.

13 Claims, 8 Drawing Sheets

ANTENNA STRUCTURE

CROSS REFERENCE TO RELATED APPLICATIONS

This application claims the benefit of U.S. Provisional Application No. 63/374,922, filed on Sep. 8, 2022, the entirety of which is incorporated by reference herein.

BACKGROUND OF THE INVENTION

Field of the Invention

The present disclosure relates to an antenna structure, and, more particularly, to a dual band or tri-band antenna structure.

Description of the Related Art

With the advancement of wireless communications technology, the performance of antennas is becoming more and more important. Antennas are essential components of all modern electronic devices that require radio-frequency functionality, such as smartphones, tablet computers, and notebook computers. As communication standards evolve to provide faster data transfer rates and higher throughput, the demands placed on antennas are increasing. For example, in order to achieve 5G communications, an antenna must support high-frequency signals. Antennas need to be compact in size, since modern electronic devices need to be slim, lightweight, and portable, and these devices have limited space available for an antenna.

BRIEF SUMMARY OF THE INVENTION

An embodiment of the present disclosure provides an antenna structure. The antenna structure includes a first metal layer and a second metal layer disposed over the first metal layer. The second metal layer forms a first antenna resonating element operating at a first band and has a first opening. The antenna structure also includes a third metal layer disposed over the second metal layer. The third metal layer forms a second antenna resonating element operating at a second band, which is different from the first band. The antenna structure further includes a first transmission line extending from the first metal layer to the second metal layer and a second transmission line extending from the first metal layer through the first opening to the third metal layer.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1A:
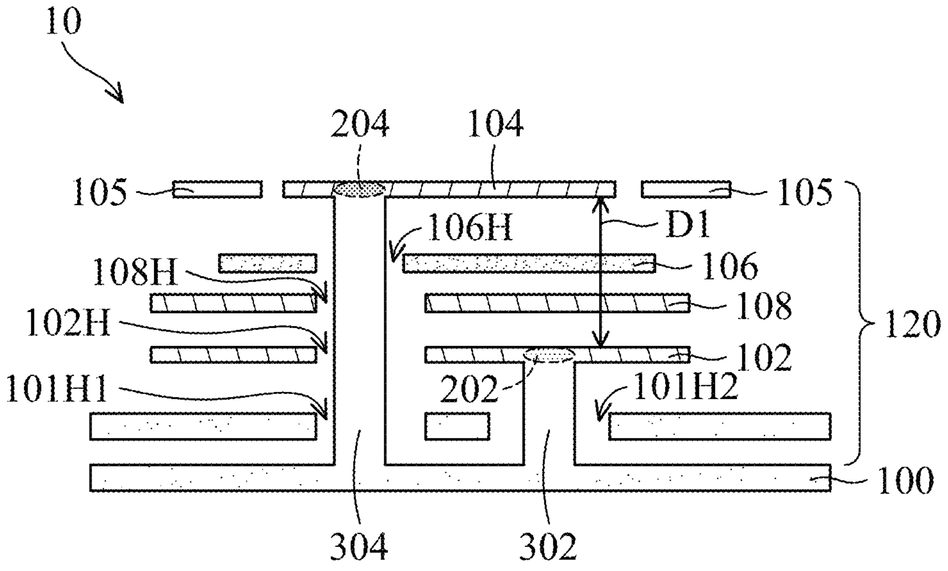
FIG. 1A is a partial cross-sectional side view of an antenna structure in accordance with some embodiments of the present disclosure.

The following disclosure provides many different embodiments, or examples, for implementing different features of the subject matter provided. Specific examples of components and arrangements are described below to simplify the present disclosure. These are, of course, merely examples and are not intended to be limiting. For example, a first feature is formed on a second feature in the description that follows may include embodiments in which the first feature and second feature are formed in direct contact, and may also include embodiments in which additional features may be formed between the first feature and second feature, so that the first feature and second feature may not be in direct contact.

It should be understood that additional steps may be implemented before, during, or after the illustrated methods, and some steps might be replaced or omitted in other embodiments of the illustrated methods.

Furthermore, spatially relative terms, such as “beneath,” “below,” “lower,” “on,” “above,” “upper” and the like, may be used herein for ease of description to describe one element or feature’s relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the present disclosure, the terms “about,” “approximately” and “substantially” typically mean +/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. That is, when there is no specific description of the terms “about,” “approximately” and “substantially”, the stated value includes the meaning of “about,” “approximately” or “substantially”.

Unless otherwise defined, all terms (including technical and scientific terms) used herein have the same meaning as commonly understood by one of ordinary skill in the art to which this disclosure belongs. It should be understood that terms such as those defined in commonly used dictionaries should be interpreted as having a meaning that is consistent with their meaning in the context of the relevant art and will not be interpreted in an idealized or overly formal sense unless expressly so defined in the embodiments of the present disclosure.

The present disclosure may repeat reference numerals and/or letters in following embodiments. This repetition is for the purpose of simplicity and clarity and does not in itself dictate a relationship between the various embodiments and/or configurations discussed.

Figure 1B:
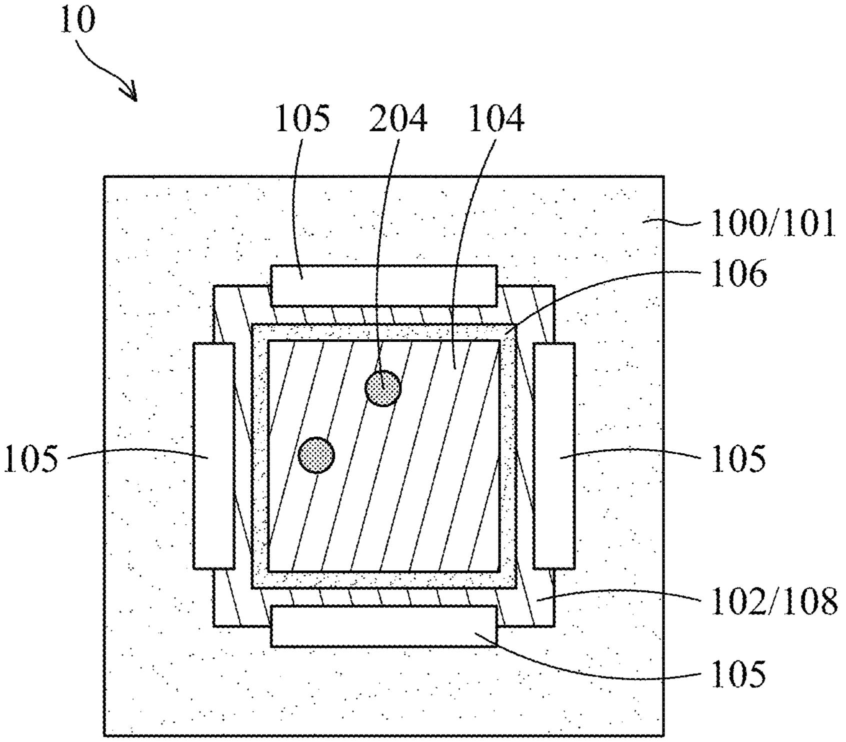
FIG. 1B is a partial top view of the antenna structure in accordance with some embodiments of the present disclosure.
Figure 1C:
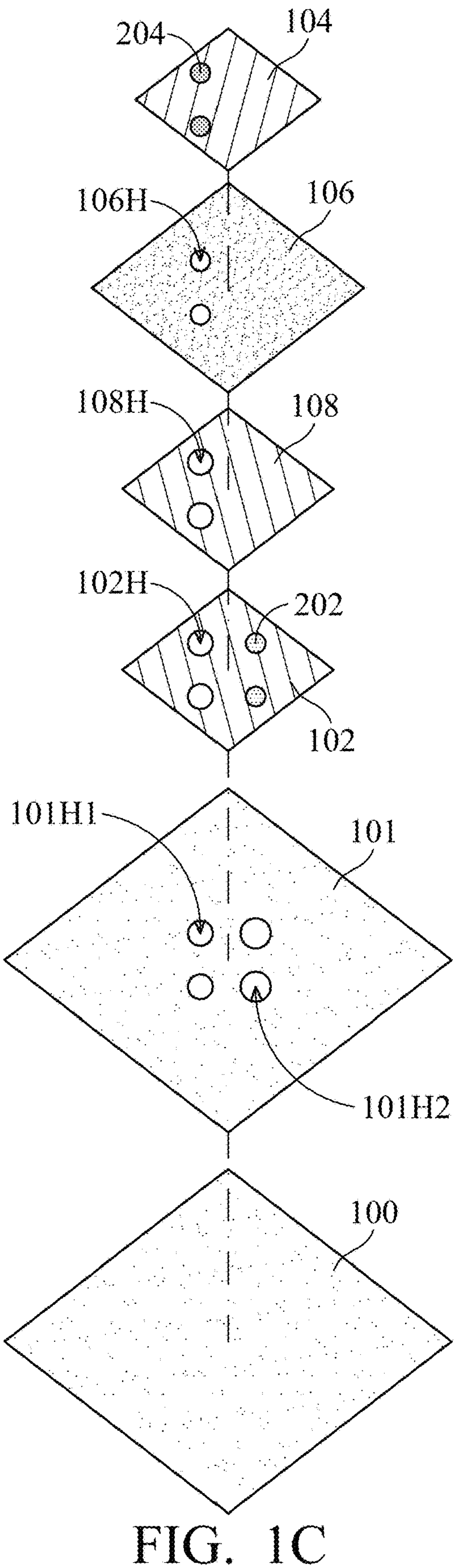
FIG. 1C is a partial exploded view of the antenna structure in accordance with some embodiments of the present disclosure.

FIG. 1A is a partial cross-sectional side view of an antenna structure 10 in accordance with some embodiments of the present disclosure. FIG. 1B is a partial top view of the antenna structure 10 in accordance with some embodiments of the present disclosure. FIG. 1C is a partial exploded view of the antenna structure 10 in accordance with some embodiments of the present disclosure. It should be noted that some components of the antenna structure 10 have been omitted in FIG. 1A to FIG. 1C for the sake of brevity, and the antenna structure 10 in FIG. 1A to FIG. 1C may not be completely corresponding.

Referring to FIG. 1A to FIG. 1C, in some embodiments, the antenna structure 10 includes a metal layer 100. The metal layer 100 may include gold (Au), nickel (Ni), platinum (Pt), palladium (Pd), iridium (Jr), titanium (Ti), chromium (Cr), tungsten (W), aluminum (Al), copper (Cu), the like, an alloy thereof, or a combination thereof. Moreover, the metal layer 100 may be formed by physical vapor deposition (PVD), chemical vapor deposition (CVD), atomic layer deposition (ALD), evaporation, sputtering, the like, or a combination thereof, but the present disclosure is not limited thereto.

As shown in FIG. 1A, in some embodiments, the antenna structure 10 includes a metal layer 102 disposed over the metal layer 100, and the metal layer 102 forms an antenna resonating element operating at a first band. For example, the antenna resonating element formed by the metal layer 102 may operate at about 28 GHz, but the present disclosure is not limited thereto. The metal layer 102 may include the same or similar material as the metal layer 100 and may be formed by the same or similar process, which will not be repeated here.

As shown in FIG. 1A and FIG. 1C, in some embodiments, the metal layer 102 has an opening 102H. The opening 102H may be formed by a patterning process. For example, a mask layer (not illustrated) may be disposed on the metal layer 102, and then an etching process is performed to etch the metal layer 102 to form the opening 102H using the mask layer as an etch mask, but the present disclosure is not limited thereto. The mask layer may include a photoresist, such as a positive photoresist or a negative photoresist. The mask layer may include a hard mask and may include silicon oxide ($SiO_2$), silicon nitride (SiN), silicon oxynitride (SiON), silicon carbide (SiC), silicon carbonitride (SiCN), the like, or a combination thereof. The mask layer may be a single layer or a multilayer structure.

The mask layer may be formed by a deposition process, a photolithography process, any other suitable process, or a combination thereof. For example, the deposition process includes spin-on coating, CVD, ALD, the like, or a combination thereof. For example, the photolithography process may include photoresist coating (e.g., spin coating), soft baking, mask aligning, exposure, post-exposure baking (PEB), developing, rinsing, drying (e.g., hard baking), any other suitable process, or a combination thereof.

The etching process may include a dry etching process, a wet etching process, or a combination thereof. For example, the dry etching process may include reactive ion etch (RIE), inductively-coupled plasma (ICP) etching, neutral beam etch (NBE), electron cyclotron resonance (ERC) etching, the like, or a combination thereof. For example, the wet etching process may use hydrofluoric acid (HF), ammonium hydroxide ($NH_4OH$), or any suitable etchant.

As shown in FIG. 1A, in some embodiments, the antenna structure 10 includes a metal layer 104 disposed over the metal layer 102. The metal layer 104 forms an antenna resonating element operating at a second band, which is different from the first band. For example, the antenna resonating element formed by the metal layer 104 may operate at about 40 GHz, 60 GHz, or over 60 GHz, but the present disclosure is not limited thereto. In this embodiment, the first band (at which the metal layer 102 operates) is lower than the second band (at which the metal layer 104 operates). The metal layer 104 may include the same or similar material as the metal layer 102 and may be formed by the same or similar process, which will not be repeated here.

As shown in FIG. 1A, in some embodiments, the antenna structure 10 includes a ground layer 101 disposed between the metal layer 100 and the metal layer 102 The ground layer 101 may include the same or similar material as the metal layers 100 and may be formed by the same or similar process, which will not be repeated here. Moreover, as shown in FIG. 1A and FIG. 1C, in some embodiments, the ground layer 101 has openings 101H1 and 101H2. The openings 101H1 and 101H2 may be formed by a patterning process.

As shown in FIG. 1A, in some embodiments, the antenna structure 10 includes transmission lines 302 and 304, the transmission line 302 extends from the metal layer 100 through the opening 101H2 to the metal layer 102, and the transmission line 304 extends from the metal layer 100 through the openings 101H1 and 102H to the metal layer 104. For example, transmission lines 302 and 304 may include a conductive through-via, a conductive pin, a metal pillar, a solder bump, a combination thereof, or any other vertical conductive interconnect structure, but the present disclosure is not limited thereto.

As shown in FIG. 1A, in some embodiments, the transmission line 302 has a feed terminal 202 at one end close to the metal layer 102, and the transmission line 304 has a feed terminal 204 at one end close to the metal layer 104. In this embodiment, the feed terminal 202 is in direct contact with the metal layer 102, and the feed terminal 204 is in direct contact with the metal layer 104, but the present disclosure is not limited thereto.

As shown in FIG. 1A and FIG. 1B, in some embodiments, the antenna structure 10 further includes additional metal layers 105 adjacent to the metal layer 104. In more detail, in a top view (e.g., FIG. 1B), the metal layer 104 may be formed into a rectangle, and there may be four additional metal layers 105 surrounds the four sides of the metal layer 104, but the present disclosure is not limited thereto. The additional metal layers 105 may help to tune resonant frequency or have better antenna matching.

As shown in FIG. 1A to FIG. 1C, in some embodiments, the antenna structure 10 further includes a metal layer 108 disposed between the metal layer 102 and the metal layer 104, and the metal layer 108 forms a parasitic element for the first band (at which the metal layer 102 operates). The metal layer 108 may enhance the first band performance (e.g., bandwidth or antenna gain). In this embodiment, the metal layer 108 has an opening 108H, and the transmission line 204 also passes through the opening 108H to the metal layer 104. The metal layer 108 may include the same or similar material as the metal layer 102 (or 104) and may be formed by the same or similar process, which will not be repeated here.

As shown in FIG. 1A to FIG. 1C, in some embodiments, the antenna structure 10 includes a metal layer 106 disposed between the metal layer 104 and the metal layer 108. In some embodiments, the metal layer 106 forms an antenna resonating element operating at a third band, which is different from both the first band and the second band. For example, the antenna resonating element formed by the metal layer 106 may operate at about 39 GHz, but the present disclosure is not limited thereto. In this embodiment, the first band (at which the metal layer 102 operates) is lower than the third band (at which the metal layer 106 operates), and the third band (at which the metal layer 106 operates) is lower than the second band (at which the metal layer 104 operates). The metal layer 106 may include the same or similar material as the metal layer 102 (or 104 or 108) and may be formed by the same or similar process, which will not be repeated here. In this embodiment, the transmission line 304 is coupled with the metal layer 106 in the opening 106H by electric field coupling, but the present disclosure is not limited thereto.

In some other embodiments, the metal layer 106 forms a parasitic element for the second band (at which the metal layer 104 operates). The metal layer 106 may enhance the second band performance (e.g., bandwidth or antenna gain). Alternately, the metal layer 106 forms a reflector for the second band (at which the metal layer 104 operates).

As shown in FIG. 1A, in some embodiments, the distance D1 between the metal layer 102 and the metal layer 104 is smaller than ¼ wavelength corresponding to the center frequency of the second band (at which the metal layer 104 operates). Moreover, in some embodiments, the antenna structure 10 includes a stacked dielectric substrate 120, and the stacked dielectric substrate 120 is interposed between the metal layers 100, 102, 104, 106, and 108, the ground layer 101, and the transmission lines 302 and 304. For example, the stacked dielectric substrate 120 may be a multilayer substrate, and may include any suitable dielectric material, such as silicon oxide, silicon nitride, silicon oxynitride, low-K dielectric material, aluminum oxide, aluminum nitride, the like, or a combination thereof, but the present disclosures is not limited thereto. The stacked dielectric substrate 120 may be formed by a deposition process, such as a CVD process, an ALD process, a spin coating process, the like, or a combination thereof.

Figure 2A:
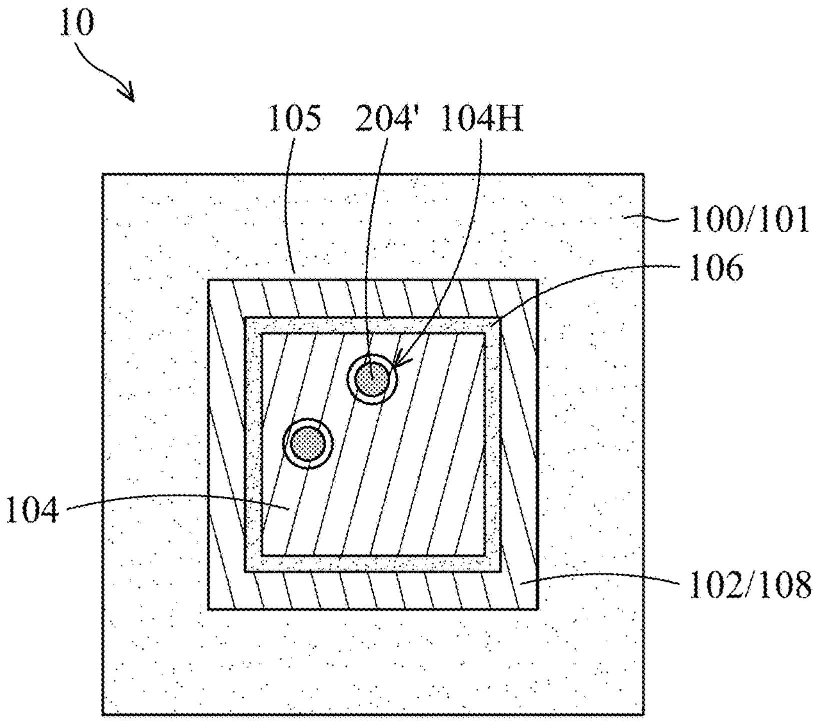
FIG. 2A, FIG. 2B, and FIG. 2C are partial top views of the antenna structure in accordance with some other embodiments of the present disclosure.
Figure 2B:
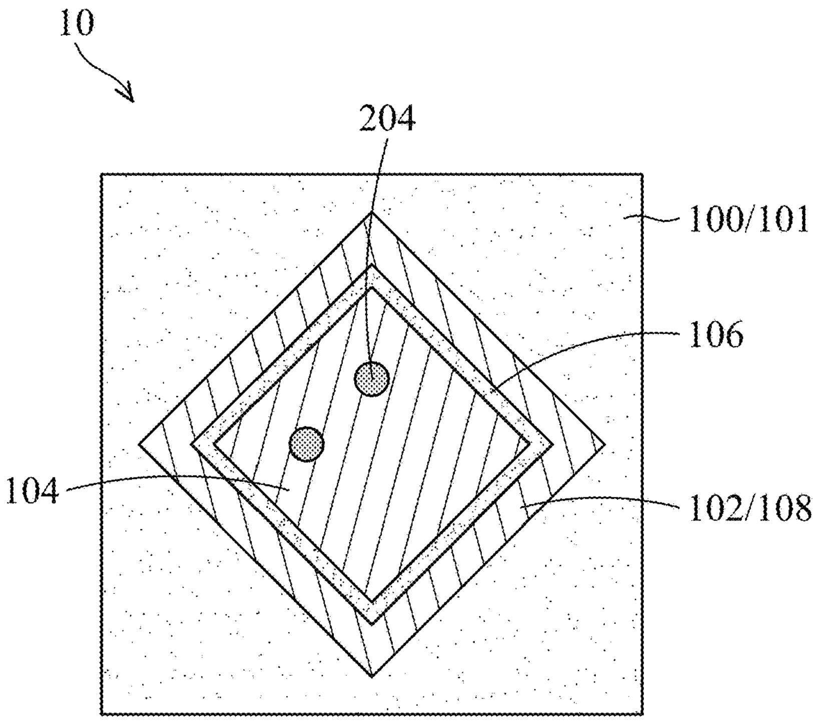
Figure 2C:
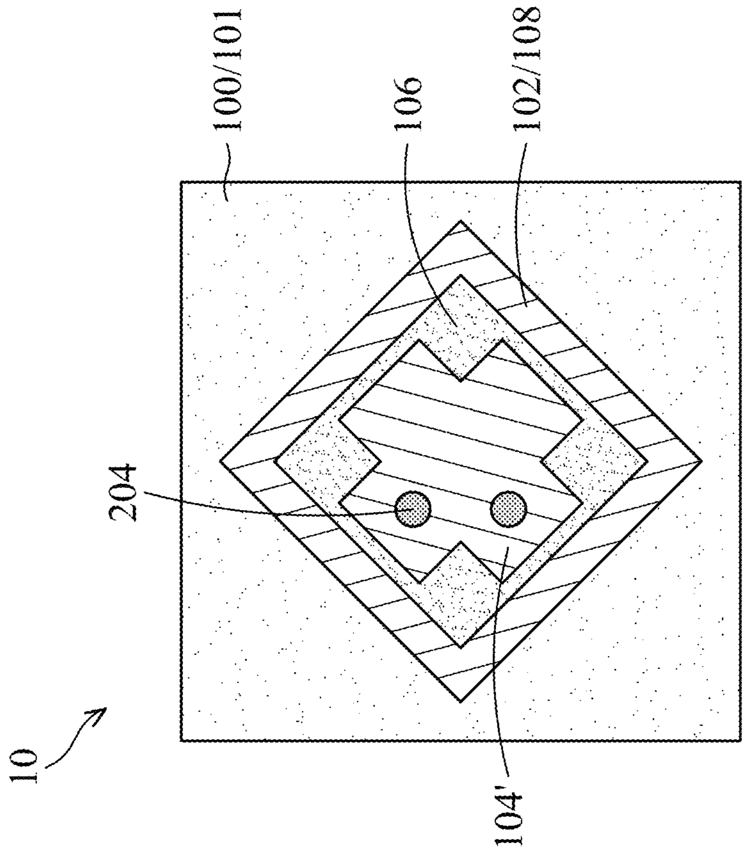

FIG. 2A, FIG. 2B, and FIG. 2C are partial top views of the antenna structure 10 in accordance with some other embodiments of the present disclosure. Referring to FIG. 2A, in this embodiment, the metal layer 104 has an opening 104H, and the feed terminal 204' of the transmission line 304 is disposed in the opening 104H of the metal layer 104 and coupled to the metal layer 104 (e.g., by electric field coupling).

Referring to FIG. 2B, in this embodiment, the metal layers 100, 102, 104, 106, and 108, and the ground layer 101 are formed into rectangles of different sizes, and the metal layers 102, 104, 106, and 108 are rotated n degrees with respect to the metal layer 100 (or the ground layer 101), where n is between 0 and about 90. For example, as shown in FIG. 2B, the metal layer 100 (or the ground layer 101) may have the largest area among the metal layers 100, 102, 104, 106, and 108, and the metal layers 102, 104, 106, and 108 may be rotated about 90 degrees with respect to the metal layer 100 (or the ground layer 101), but the present disclosure is not limited thereto.

Referring to FIG. 2C, in this embodiment, the metal layers 100, 102, 106, and 108, and the ground layer 101 are formed into rectangles of different sizes, while the metal layer 104' is formed into a cross. Similarly, as shown in FIG. 2C, the metal layer 100 (or the ground layer 101) may have the largest area among the metal layers 100, 102, 104, 106, and 108, and the metal layers 102, 106, and 108 may be rotated about 90 degrees with respect to the metal layer 100 (or the ground layer 101), but the present disclosure is not limited thereto.

Figure 3A:
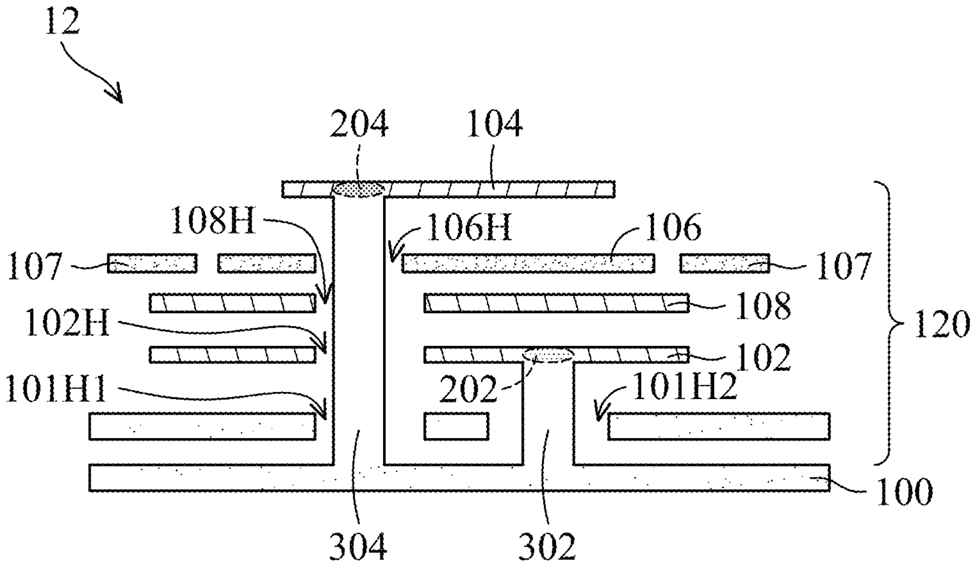
FIG. 3A is a partial cross-sectional side view of an antenna structure in accordance with some other embodiments of the present disclosure.
Figure 3B:
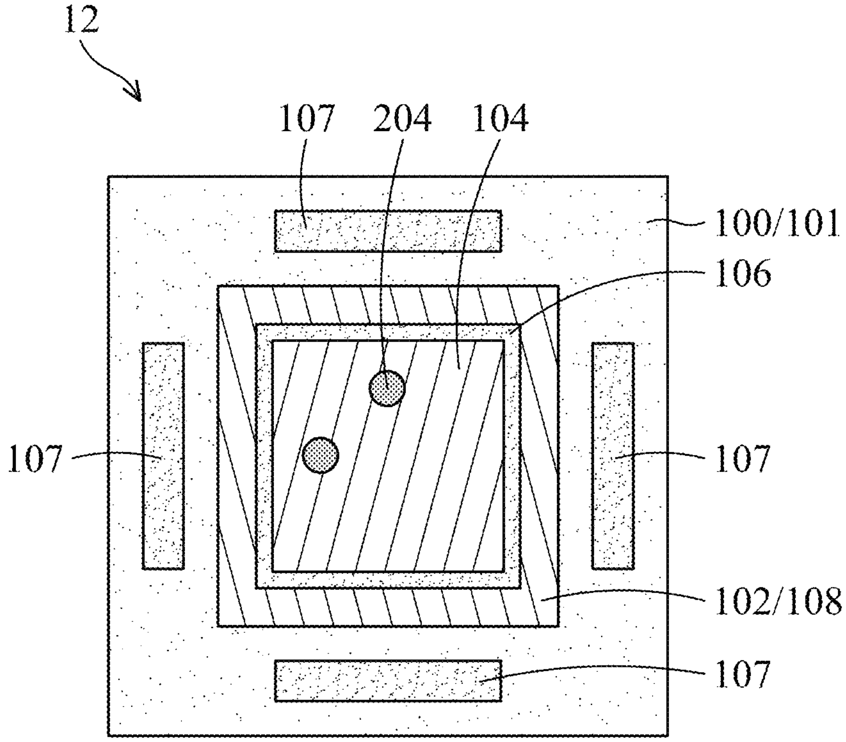
FIG. 3B is a partial top view of the antenna structure in accordance with some other embodiments of the present disclosure.

FIG. 3A is a partial cross-sectional side view of an antenna structure 12 in accordance with some other embodiments of the present disclosure. FIG. 3B is a partial top view of the antenna structure 12 in accordance with some other embodiments of the present disclosure. Similarly, some components of the antenna structure 12 have been omitted in FIG. 3A and FIG. 3B for the sake of brevity, and the antenna structure 12 in FIG. 3A and FIG. 3B may not be completely corresponding.

Referring to FIG. 3A and FIG. 3B, the antenna structure 12 has a similar structure to the antenna structure 10 shown in FIG. 1A to FIG. 1C. The main difference from the antenna structure 10 is that the antenna structure 12 further includes additional metal layers 107 adjacent to the metal 106. Similarly in a top view (e.g., FIG. 3B), the metal 106 may be formed into a rectangle, and there may be four additional metal layers 107 surrounds the four sides of the metal 106, but the present disclosure is not limited thereto. The additional metal layers 107 may help to tune resonant frequency or have better antenna matching.

Figure 4:
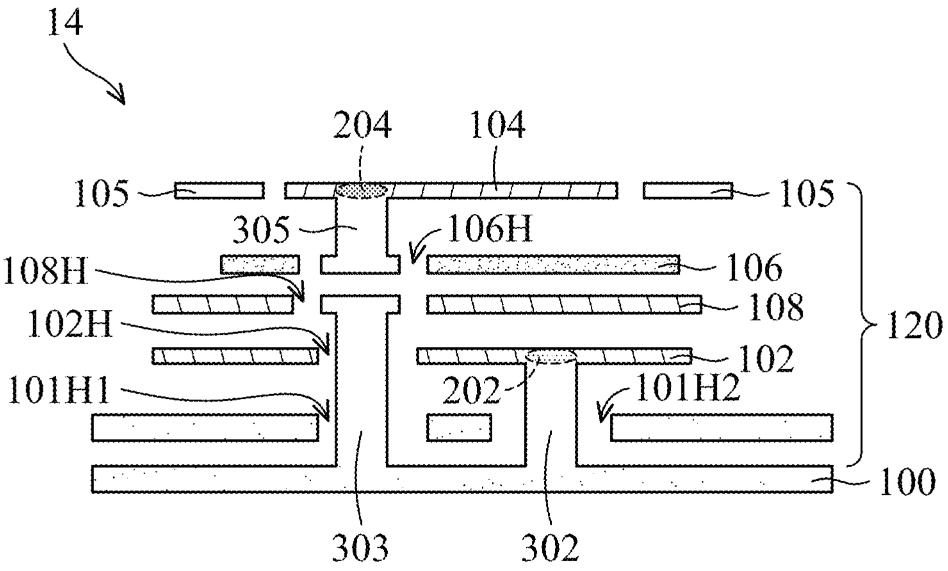
FIG. 4 is a partial cross-sectional side view of an antenna structure in accordance with some other embodiments of the present disclosure.
Figure 5:
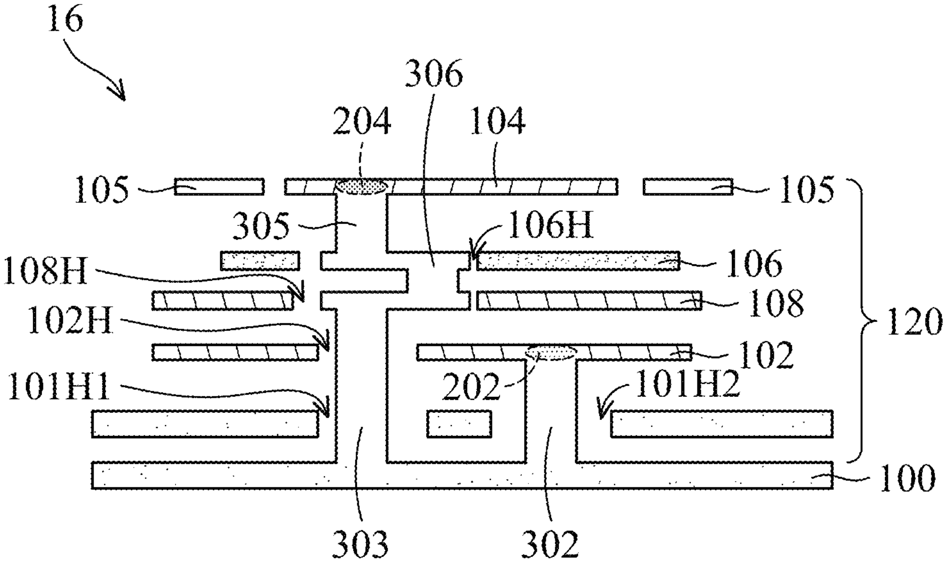
FIG. 5 is a partial cross-sectional side view of an antenna structure in accordance with some other embodiments of the present disclosure.

FIG. 4 is a partial cross-sectional side view of an antenna structure 14 in accordance with some other embodiments of the present disclosure. FIG. 5 is a partial cross-sectional side view of an antenna structure 16 in accordance with some other embodiments of the present disclosure. Similarly, some components of the antenna structure 14 or 16 have been omitted in FIG. 4 and FIG. 5 for the sake of brevity.

Referring to FIG. 4, in some embodiments, the transmission line 304 is divided into a first portion 303 and a second portion 305, the first portion 303 extends from the metal layer 100 through the opening 101H1 of the ground layer 100 and the opening 102H of the metal layer 102 to the opening 108H of the metal layer 108, and the second portion 305 extends from the opening 106H of the metal layer 106 to the metal layer 104. As shown in FIG. 4, the first portion 303 and the second portion 305 of the transmission line 304 are separate and floating.

Referring to FIG. 5, in some embodiments, the transmission line 304 is further divided into a third portion 306 that is connected to the first portion 303 and the second portion 305. In this embodiment, the third portion 306 does not correspond (connected) to the center of the first portion 303 and the center of the second portion 305.

Figure 6:
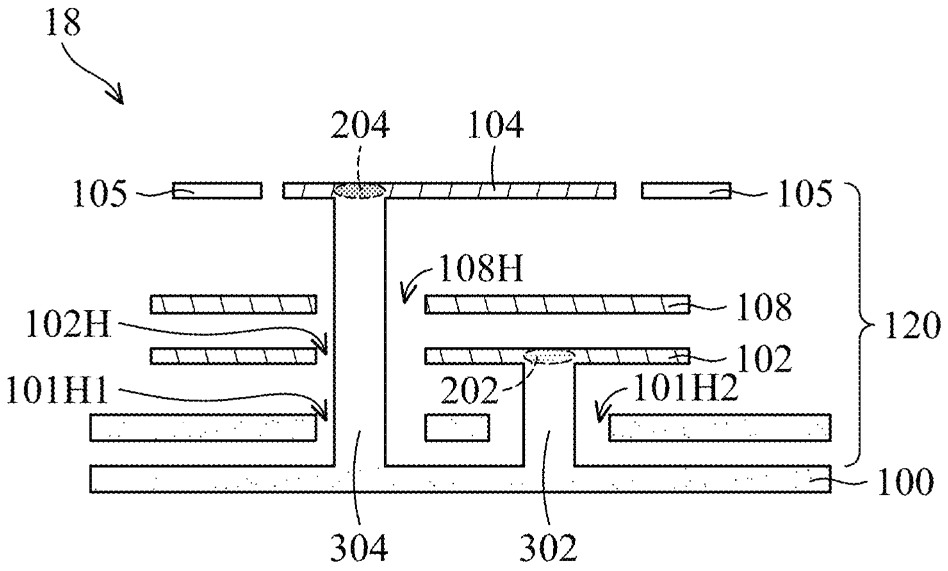
FIG. 6 is a partial cross-sectional side view of an antenna structure in accordance with some other embodiments of the present disclosure.
Figure 7:
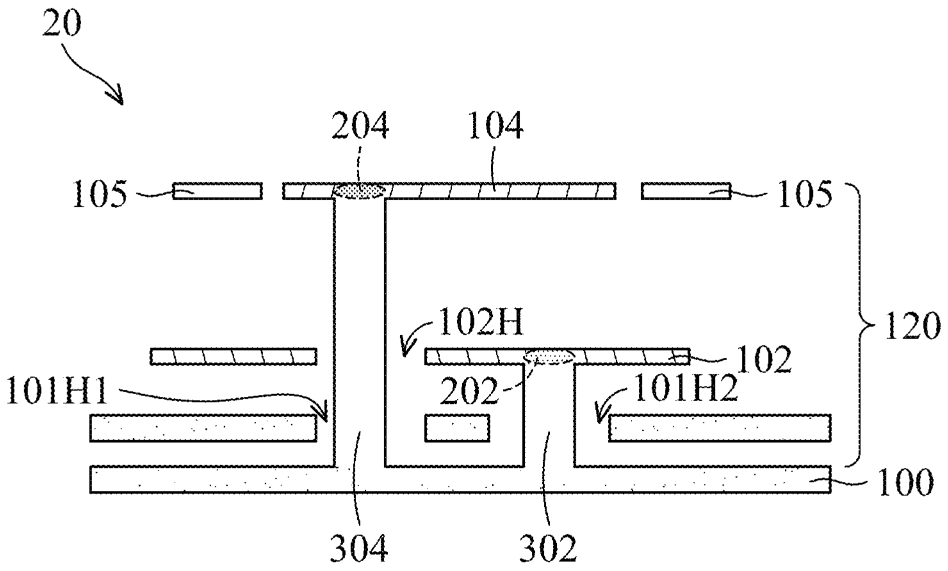
FIG. 7 is a partial cross-sectional side view of an antenna structure in accordance with some other embodiments of the present disclosure.

FIG. 6 is a partial cross-sectional side view of an antenna structure 18 in accordance with some other embodiments of the present disclosure. FIG. 7 is a partial cross-sectional side view of an antenna structure 20 in accordance with some other embodiments of the present disclosure. Similarly, some components of the antenna structure 18 or 20 have been omitted in FIG. 6 and FIG. 7 for the sake of brevity.

Referring to FIG. 6 and FIG. 7, in some embodiments, the antenna structure 18 or 20 includes a metal layer 100 and a metal layer 102 disposed over the metal layer 100. The metal layer 102 forms an antenna resonating element operating at a first band and has an opening 102H. The antenna structure 18 or 20 also includes a metal layer 104 disposed over the metal layer 102. The metal layer 104 forms an antenna resonating element operating at a second band, which is different from the first band. The antenna structure 18 or 20 further includes a transmission line 302 extending from the metal layer 100 through the opening 101H2 to the metal layer 102 and a transmission line 304 extending from the metal layer 100 through the openings 101H1 and 102H to the metal layer 104.

As shown in FIG. 6, in this embodiment, the antenna structure 18 includes a metal layer 108 disposed between the metal layer 102 and the metal layer 104, and the metal layer 108 forms a parasitic element for the first band (at which the metal layer 102 operates). The metal layer 108 may enhance the first band performance (e.g., bandwidth or antenna gain). In this embodiment, the metal layer 108 has an opening 108H, and the transmission line 204 also passes through the opening 108H to the metal layer 104.

Moreover, as shown in FIG. 6 and FIG. 7, in some embodiments, the antenna structure 18 or 20 further includes additional metal layers 105 adjacent to the metal 104. In more detail, the additional metal layers 105 may surround the metal 104, but the present disclosure is not limited thereto. The additional metal layers 105 may help to tune resonant frequency or have better antenna matching. It should be noted that the position of the additional metal layers 105 may be changed (e.g., adjacent to any other metal layer) depending on the actual need.

Figure 8B:
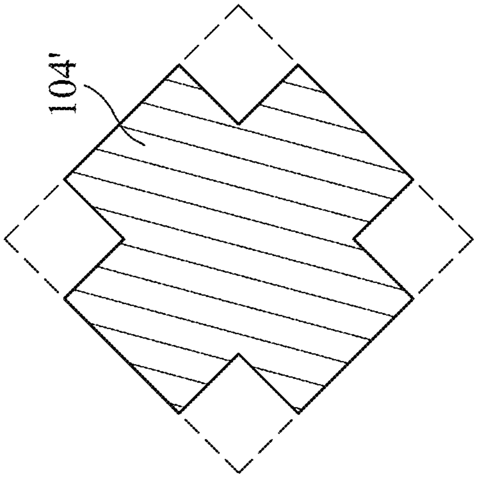
FIG. 8A, FIG. 8B, and FIG. 8C are partial top views illustrating metal layers that have different shapes.
Figure 8A:
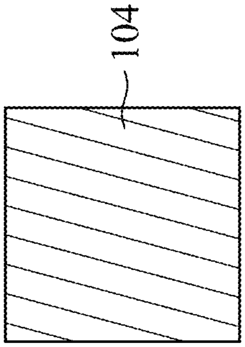
Figure 8C:
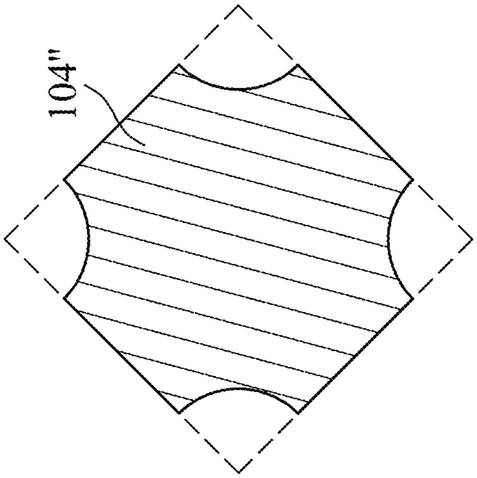

FIG. 8A, FIG. 8B, and FIG. 8C are partial top views illustrating metal layers that have different shapes. It should be noted that although the metal layer show in FIG. 8A, FIG. 8B, and FIG. 8C are labeled 104, 104', and 104" (i.e., the topmost metal layer), they also may represent any other metal layer in the forgoing antenna structures.

As shown in FIG. 8A, the metal layer 104 is formed into a rectangle. As shown in FIG. 8B, the metal layer 104' is formed into a cross. As shown in FIG. 8C, the metal layer 104" is formed into a shape formed by cutting out four corners of a rectangle, which may help the antenna structure to obtain better gain or wider bandwidth.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. Therefore, the scope of protection should be determined through the claims. In addition, although some embodiments of the present disclosure are disclosed above, they are not intended to limit the scope of the present disclosure.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize, in light of the description herein, that the disclosure can be practiced without one or more of the specific features or advantages of a particular embodiment. In other instances, additional features and advantages may be recognized in certain embodiments that may not be present in all embodiments of the disclosure.

What is claimed is:

1. An antenna structure, comprising:

a first metal layer;

a second metal layer disposed over the first metal layer, wherein the second metal layer forms a first antenna resonating element operating at a first band and has a first opening;

a third metal layer disposed over the second metal layer, wherein the third metal layer forms a second antenna resonating element operating at a second band different from the first band;

a first transmission line extending from the first metal layer to the second metal layer;

a second transmission line extending from the first metal layer through the first opening to the third metal layer;

a fourth metal layer disposed between the second metal layer and the third metal layer, wherein the fourth metal layer forms a parasitic element for the first band and has a second opening, and the second transmission line passes through the second opening to the third metal layer; and a fifth metal layer disposed between the third metal layer and the fourth metal layer, wherein the fifth metal layer forms a third antenna resonating element operating at a third band different from the first band and the second band, or the fifth metal layer forms a parasitic element or a reflector for the second band, wherein the fifth metal layer has a third opening, and a width of the first opening and a width of the second opening are both greater than a width of the third opening, wherein the second transmission line passes through the third opening to the third metal layer, and wherein the second transmission line is divided into a first portion and a second portion, the first portion extends from the first metal layer through the first opening to the second opening, and the second portion extends from the third opening to the third metal layer.

2. The antenna structure as claimed in claim 1, wherein the first transmission line has a first feed terminal at one end close to the second metal layer, and the second transmission line has a second feed terminal at one end close to the third metal layer.

3. The antenna structure as claimed in claim 2, wherein the first feed terminal is in direct contact with the second metal layer, and the second feed terminal is in direct contact with the third metal layer.

4. The antenna structure as claimed in claim 2, wherein the third metal layer has an opening, and the second feed terminal is disposed in the opening of the third metal layer and coupled to the third metal layer by electric field coupling.

5. The antenna structure as claimed in claim 1, further comprising:

additional metal layers adjacent to the third metal layer.

6. The antenna structure as claimed in claim 1, wherein the first band is lower than the third band, and the third band is lower than the second band.

7. The antenna structure as claimed in claim 1, wherein the first portion and the second portion are separate and floating.

8. The antenna structure as claimed in claim 1, wherein the second transmission line is further divided into a third portion that is connected to the first portion and the second portion.

9. The antenna structure as claimed in claim 1, further comprising:

additional metal layers adjacent to the fifth metal layer.

10. The antenna structure as claimed in claim 1, further comprising:

a ground layer disposed between the first metal layer and the second metal layer.

11. The antenna structure as claimed in claim 1, wherein the second metal layer and the third metal layer are rotated n degrees with respect to the first metal layer, and n is between 0 and 90.

12. The antenna structure as claimed in claim 1, wherein in a top view, the third metal layer is formed into a rectangle, a cross, or a shape formed by cutting out four corners of a rectangle.

13. The antenna structure as claimed in claim 1, wherein the distance between the second metal layer and the third metal layer is smaller than ¼ wavelength corresponding to a center frequency of the second band.

* * * * *